Nov. 21, 1939.  B. B. FOLLETT  2,180,871
CIRCUIT BREAKER FOR ELECTRICALLY POWERED VEHICLES
Filed Dec. 18, 1936  2 Sheets-Sheet 1
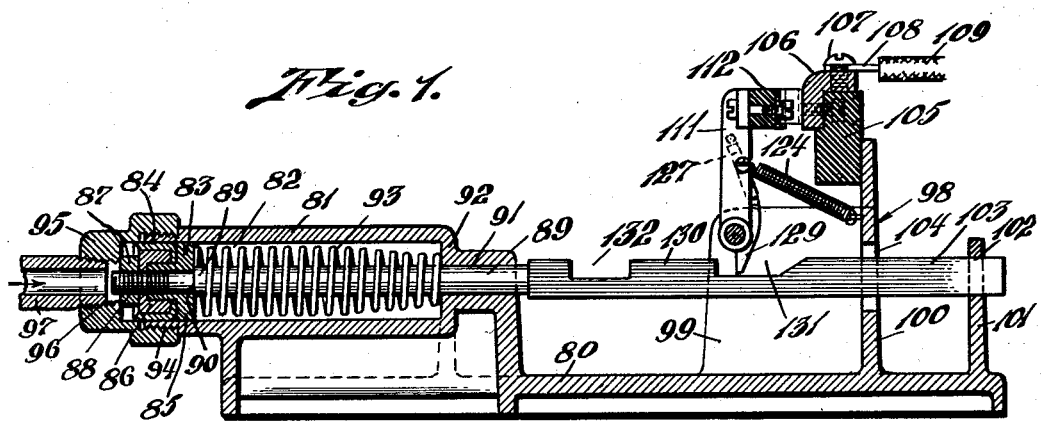
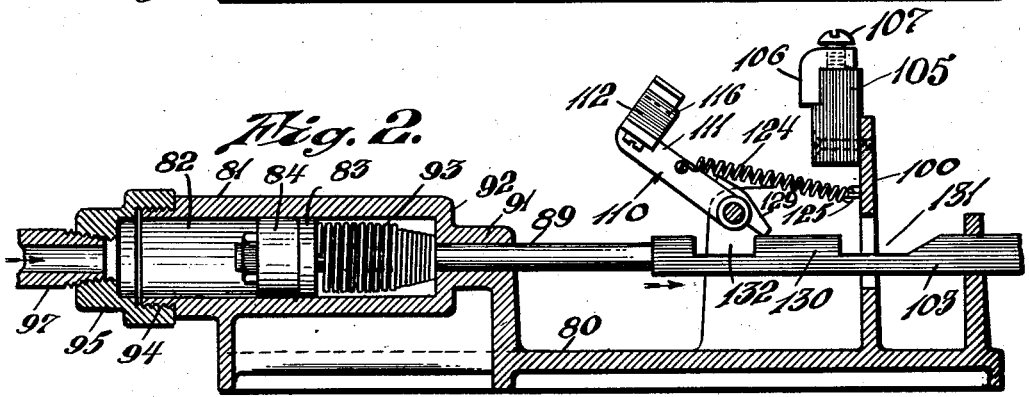
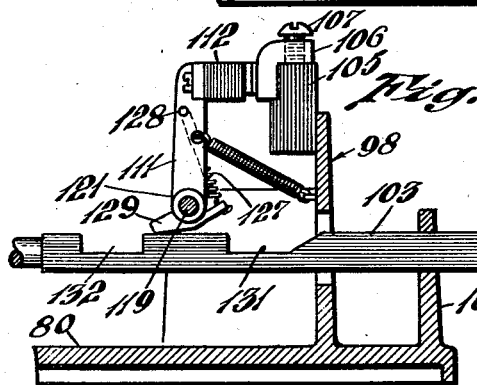
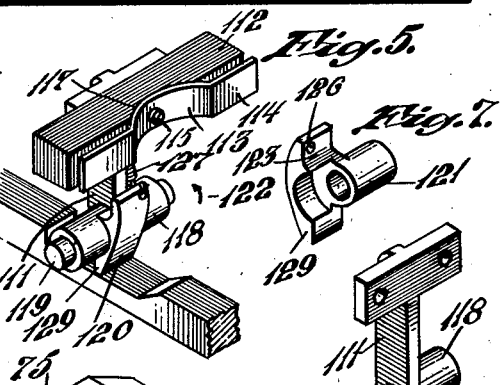
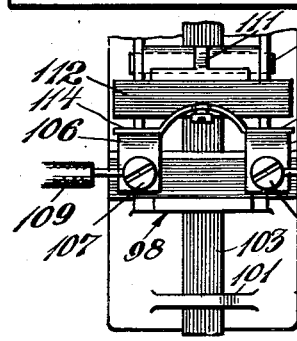
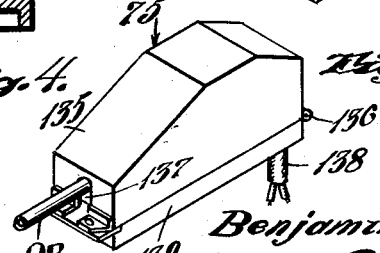
INVENTOR.
Benjamin B. Follett
BY Barlow & Barlow
ATTORNEYS.

Nov. 21, 1939.   B. B. FOLLETT   2,180,871
CIRCUIT BREAKER FOR ELECTRICALLY POWERED VEHICLES
Filed Dec. 18, 1936   2 Sheets-Sheet 2
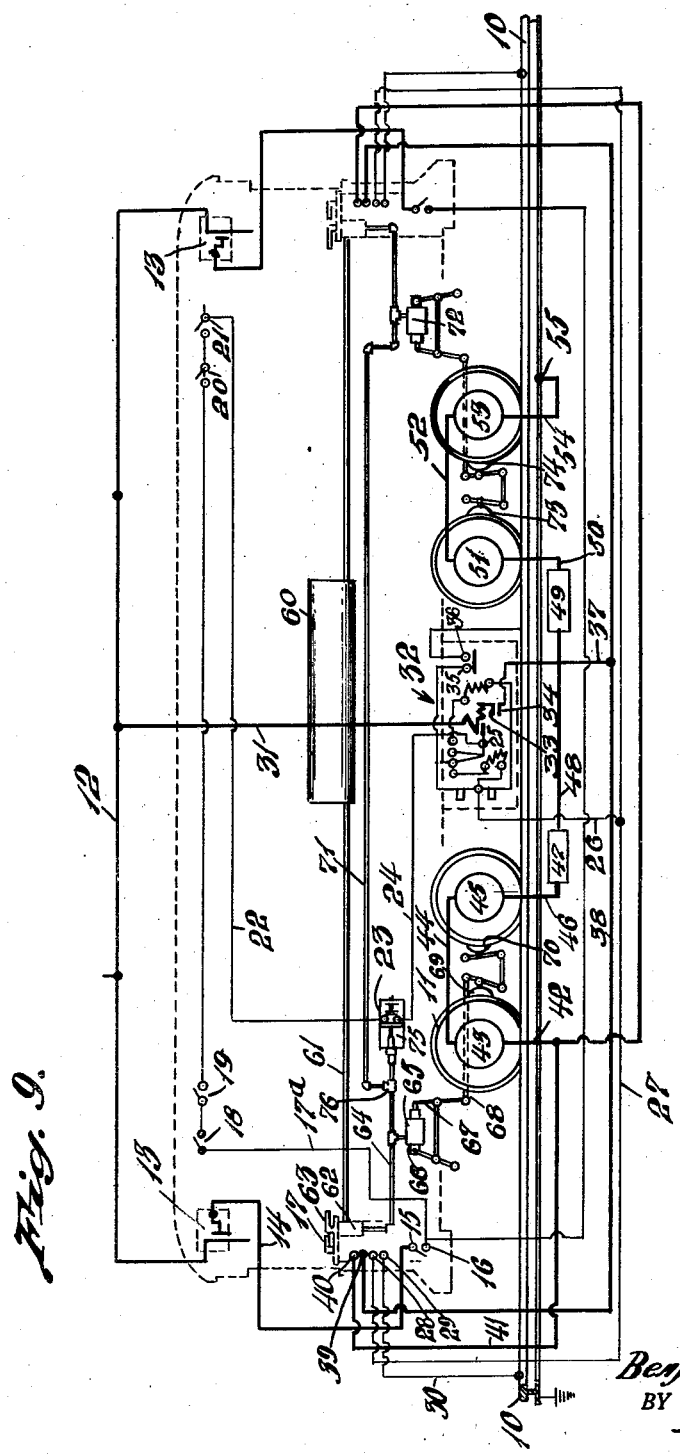
INVENTOR.
Benjamin B. Follett
BY
Barlow & Barlow
ATTORNEYS.

Patented Nov. 21, 1939

2,180,871

UNITED STATES PATENT OFFICE 2,180,871

CIRCUIT BREAKER FOR ELECTRICALLY POWERED VEHICLES

Benjamin B. Follett, Warwick, R. I., assignor to United Electric Railways Company, a corporation of Rhode Island Application December 18, 1936, Serial No. 116,567

10 Claims. (Cl. 192—2)

This invention relates to an electrically driven vehicle more particularly of a rather heavy type using power brakes for the purpose of controlling and stopping the vehicle, such for instance as a street car or other electrically driven public conveyances.

One of the objects of the present invention is to minimize wear and tear on the vehicle, particularly the brake shoes, wheels, motor bearings, pinions and gears thereof by preventing a manipulation of the control in a manner against that which is prescribed by the owner of the vehicle, such for instance as the application of the brakes of the vehicle while the power is applied for driving the vehicle forward.

Another and more specific object of the invention is the automatic shutting off of the driving power at the instant the brakes are applied and yet permit the re-application of the driving power before the brakes are released, with an arrangement such that during the braking range before the wheels are locked no driving power can be used, but yet after the wheels are locked as in dead-stop position, the power may be re-applied by a movement of the current controller from a starting position.

Another object of the invention is to prevent arcing in the device by the locating of such device in an auxiliary controlling circuit carrying a small amount of energy instead of in a main heavy current carrying circuit in which the main power for driving the vehicle is conveyed.

With these and other objects in view, the invention consists of certain novel features of construction, as will be more fully described, and particularly pointed out in the appended claims.

In the accompanying drawings:

Fig. 1 is a sectional view of the device which I utilize for performing the useful functions of this invention with the circuit controlling switch in closed position;

Fig. 2 is a view similar to Fig. 1 with the circuit closing switch in open position;

Fig. 3 is a fragmental sectional view showing the position of the pawl upon a return movement of the piston under action of the spring;

Fig. 4 is a top plan view of the electrical contact making and breaking portion of the device;

Fig. 5 is a fragmental perspective view of the circuit closing member;

Fig. 6 is a perspective view of the arm upon which the circuit closing member is mounted;

Fig. 7 is a perspective view of the pawl for operating this member shown in Fig. 6;

Fig. 8 is a perspective view showing the housing for closing in the device;

Fig. 9 is a schematic diagram of some of the electric circuits in a street car.

In the use of electrically propelled vehicles, particularly those known as street cars which derive their power from some supply line through the means of a trolley or the like, power brakes, such as air brakes, are used in order to stop or control the speed of the vehicle. As a safety measure in such vehicles, there is usually provided a control circuit which is so arranged that should any door of the vehicle be opened the control circuit is opened and the main power circuit is opened so that no supply power is available to the motors to propel the vehicle. The power controller lever requires some little strength to move it from one notch to another and frequently when moved to cruising speed an operator will allow the same to remain there and govern the speed of the vehicle by the use of the air brake control lever which is relatively light and easy to operate. At times such operator will completely stop the car with the power control lever allowed to be on to full cruising speed. This condition particularly would be practiced if a stop had to be made on an up-grade. On an up-grade it is necessary that the power be applied ahead of the complete release of the brake in order to prevent back rolling of the car, and to stop without shutting off the power would allow the operator to merely release the brakes and save the operator one complete throw of the power control lever. The stopping of a vehicle of this character with the power on brings a severe strain upon various parts of the vehicle, particularly the brake shoes, wheels, motor bearings, pinions and gears. It is desirable to put on power when the car stops on a hill before the brakes are released, and devices which have heretofore been devised to break the circuit when the brake is put on, had the disadvantage that the brake must be released before the circuit can again be put into operation, and this causes a back slipping of the car. In order to avoid these disadvantages, I have provided an interrupter device which is operated by the air brake pressure so that as the brakes begin to be applied, the control circuit is interrupted; however, when the brakes are applied to a predetermined point or when in locked position, such as when stopped, and in which position it is necessary for the brakes to be before the doors can be opened, the current is re-supplied, so that after the brakes have been fully applied, the current is again available, but by reason of already used mechanism the operator must throw the control lever back to starting, which is necessary in order to pick up the load gradually so that he will have power before he permits the brakes to be fully released; and the following is a more detailed description of the present embodiment of this invention, illustrating the preferred means by which these advantageous results may be accomplished:

With reference to the drawings, the schematic diagram, Fig. 9, illustrates certain of the electric circuits which are typical of those present in a street car and will be first described in order to show the relation which the device embodying my invention bears in its primary intended use. In the particular illustration the vehicle shown runs on tracks which form one side of the circuit or a ground.

The rails are designated 10 upon which wheels 11 of the vehicle are guided. A trolley base 12 is located within the vehicle and electrically connects with the base of the trolley, (not shown) which extends up to the supply line. This trolley base is connected through either directional switch 13 at the opposite ends of the vehicle to the controller box as by lead 14. The controller box has a plurality of contacts and switch mechanisms. One contact of one pair is designated 15 and the other is designated 16. The operating hand lever 17 of the controller has such mechanical mechanism movable therewith as to cause the contacts 15 and 16 to be bridged upon movement of the control lever 17 to a certain position, usually called the "first notch", there being the usual ratchet arrangement for causing this connection, the arrangement being such that in order to close this connection after current has ceased to flow through the control line it is necessary to move the handle lever 17 to starting position in order to cause this connection to be made. This connection along with closing contacts 28, 29 closes the control circuit which may be traced from the contact 16 along lead 17a, switches 18 and 19, 20 and 21, lead 22, switch 23, lead 24, to the contact 25 of the circuit breaker having a plurality of relay contacts, thence through lead 26, 27, contacts 28, 29 and lead 30 to the ground. One of the switches, 18, 19, 20, 21 are opened upon opening of one of the doors of the vehicle and are closed upon that door being closed, it thus becoming necessary to have the switches 18 to 21 inclusive, closed in order that the control circuit be complete. The switch 23 is in the device which forms the subject of this invention, and will be hereinafter more fully described, it also must be closed in order that the auxiliary or control circuit operate. The main line breaker 32 having a plurality of relay contacts and other usual operating mechanism in the main circuit is controlled by this auxiliary control circuit.

When this control line, just described, is closed and energy passes, the line breaker closes the main circuit from the trolley base through the motors to the ground which may be traced from the trolley base 12 through the lead 31 to the line breaker 32 which has contacts 33 and 34 which are closed through a suitable relay or solenoid when the control line is closed so as to supply current directly from the trolley base through these contacts, and at the same time contacts 35 and 36 are closed to complete connection to the ground of the main line circuit.

The main line circuit thus when closed may be further traced as through the contacts 33 and 34, lead 37, lead 38 to the controller contact 39 and thence through some other selected contact such as 40, line 41, line 42 to a motor 43 which is denoted as upon the axle of the car wheel 11. This motor is in series through lead 44 with a motor 45 on a companion wheel axle, thence through lead 46, resistance 47, lead 48, resistance 49, lead 50, to a motor 51, thence through lead 52 to a motor 53 and thence through lead 54 to a suitable ground 55, shown as on the rail 40, such ground connection being made through the wheel.

But one complete circuit at one end of the vehicle is attempted to be explained, as other circuits are similar and for the purposes of the present invention are the same. The mechanism at the opposite end of the vehicle is a substantial duplication of that just described and will not be attempted to be described in detail.

There is also schematically shown the air control for the brakes consisting of an air reservoir 60 from which air is supplied through a tubular conduit 61 having a control valve 62 and a control handle 63 therefor and through a continuing tubular conduit 64 to a brake cylinder 65 which has an operating plunger 66 and suitable linkage mechanism 67, 68, etc., for causing the brake shoes 69 and 70 to apply pressure to the wheels 11 in a known manner. A plurality of these mechanisms may be operated simultaneously through branch conduits, there being shown a suitable connection 71 transmitting air pressure from the conduit 64 to another brake cylinder 72 which similarly and simultaneously applies brake shoes 73 and 74 on other wheels of the vehicle. This is all in accord with a known manner of operation and need not be further described in detail.

The device which forms the subject of this invention is designated generally 75 and is connected into the air line supply as at 76 so that as air pressure is supplied to operate the brake it is also supplied to the device 75, as will more fully hereinafter appear.

The unit 75 consists of a casting having a base 80 with a cylindrical chamber 81 bored out as at 82 in which there is mounted for reciprocation a piston designated generally 83 and which includes a cup packing 84 suitably held in desired position by a disk-shaped member 85 and a washer 86 which are forced together on the packing 84 by means of a nut 87 threaded on to the reduced end 88 of the rod 89 having a shoulder 90 against which the disk 85 engages. This piston rod 89 also extends through and has a slidable bearing 91 in the closed end 92 of the cylindrical chamber 81. A spring 93 encircles this rod and acts between this closed end 92 and the disk 85 tending to force the piston in one direction which is to the left in the showings of Figs. 1 or 2. This spring is selected as to its amount of resiliency so as to afford a proper and predetermined resistance, as will be hereinafter more fully explained. The cylindrical chamber 81 is reduced and externally threaded as at 94 and a closure cap 95 is threaded onto this end of the cylindrical chamber 81. This cap has a threaded orifice 96 in which a tube 97 is positioned for supplying fluid pressure, in this instance air pressure, to the end of the piston to force it inwardly against the spring.

At a point near the opposite end of the base 80 the casting extends upwardly to provide a column 98 comprising a pair of spaced walls 99 joined by a bridging wall 100, while a similar wall 101 extends upwardly at the end of the base to provide a bearing and sliding support 102 for the rod 103 which is square in cross section and extends freely through the opening 104 in the wall 100 and is attached to or a continuation of the rod 89, heretofore described. This rod 89, 103 thus slides back and forth in its guides in response to the action of the piston.

On the upper end of the column and attached to the upwardly extended back wall 100 there is provided an insulating block 105 upon which there is mounted a pair of copper contact members 106 each having a threaded screw 107 for attachment of the wire 108 thereto, the wire having a suitable insulating covering 109 thereon. These contacts are thus connected in the control line circuit and designated in a general manner as a switch 23 in the schematic Fig. 9, first above described. The leads to and from these contacts are designated in that schematic drawing 22 and 24.

A support for the bridging of these contacts 106 consists of a pivoted member 110 comprising a lever arm 111 at the upper end of which is supported an insulating block 112, this insulating block has an arcuate cut out 117 leaving a lip 116 as a guide for a floatingly mounted metallic, preferably copper, conductor 113 having its lower edge guided by the lip and flat portions 114 for engaging the contacts 106, the floating mounting being such that the same may be rocked about a pivotal fastening 115. Thus, this contact may rock about the loose pivotal connection 115 in order to firmly engage both of the contacts 106.

The lever arm 111 has a tubular bearing 118 extending from one side thereof and is pivotally mounted upon a pin 119 which extends through and is supported by the walls 99. In order to swing this lever 111 about its pivot pin 119 I have provided a pawl designated generally 120 which consists of a tubular bearing portion 121 supported on the pin 119 on the opposite side of the lever 111 from its tubular bearing 118. This pawl is freely rockable about the pin 119 in one direction, but when moved in the opposite direction, such as shown by the arrow 122, the upper edge of this pawl 123 engages the lever 111 adjacent its bearing 118 and swings the lever about the pivot pin 119 against the action of the spring 124 which is attached to the lever and also to the wall 100 as at 125. In order that this pawl may be maintained in engagement with the lever I have provided a hole 126 to which a spring 127 is attached and in turn is attached to another pin or convenient point 128 on the lever 111 (see Fig. 3).

This pawl has a portion 129 which extends downwardly below the pivot 119 and is in the path of movement of a portion 130 of the rod 103. This rod 103 has a portion cut away as at 131 and another portion cut away as at 132, leaving the portion 130 raised relative to these cut away portions. When the device is in the position shown in Fig. 1 the cut away portion 131 receives the pawl 129 allowing the lever to be swung by spring 124 to cause the bridging portion 113 to engage the contacts 106 and close the circuit. When the air pressure in the reservoir 60 is used for operating the brake, air passes through the conduit 64 to the brake cylinders, and air also enters the cylinder 81 to force the piston inwardly against the pressure of the spring 93. The air pressure in the cylinders 60 is usually sixty-five pounds in street cars, and I have selected the spring 93 so that the piston will start to operate as soon as a sufficient pressure builds up to cause the brake shoes to initially engage the wheels. Thus, just after the brake shoes touch the wheels the raised portion 130 of the rod will move into contact with the pawl 129 and move the same about its pivot, thus carrying the lever 111 about its pivot and breaking the contact as 106, 113, 106, and thus breaking the control circuit in the vehicle, which will cause the line breaker to operate so that no power will be supplied to drive the wheels of the vehicle. Continued operation of the brake to slow down the vehicle will cause the piston to be further advanced in the cylinder 81 and the rod 103 advanced so that the pawl 129 will drop into the space 132. When this occurs the lever 111 will be swung about its pivotal mounting by the spring 124 to cause a closure of the contacts 106 by the bridging member 113 and thus the control line will be again closed and power in the main line will be available for use for starting the motors, it being necessary, however, that the controller handle 17 be thrown to inoperative position before a subsequent advance in order that the ratchet switch may operate to initially again close its connection across contacts 15, 16 in the control line.

The raised portion 130 on the rod 103 may be of any desired length so as to cause the operation of the breaking and making of the circuit as desired. Likewise, the spring 93 may be varied for this purpose, the primary feature being some means for permitting the closure of the control circuit after once broken and before the brakes are completely released. It is usual that the brakes are fully applied before the doors can be opened or when a stop is made, and accordingly the pressure will build up so as to force the piston 83 to a sufficient extent to cause this completion of the circuit at contacts 106. However, even if the brakes be applied by a partial opening of the control valve 62 as operated by handle 63 the pressure will be gradually applied and gradually be built up until the device operates to such an extent as to cause a completion of the circuit by movement of the pawl into the space 132, as above described.

In order that the device may be nicely housed and be kept free from dirt or foreign matter, I have provided a cover 135 hinged as at 136 to swing over the operating parts of the device, leaving the conduit 97 for the supply of air extending through a notch 137 therein while the wires 138 extend through a suitable plate 139 upon which the base 80 of the instrument may be mounted. These wires 138 correspond to the leads 22 and 24.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination with a vehicle having braking means and means for electric power propulsion including an electric circuit, of a mechanism comprising a means responsive to the operation of said braking means including a member operable in a single direction to initially cause breaking of the said circuit and to then subsequently cause restoring of the said circuit prior to the complete release of said braking means.

2. In combination with a vehicle having braking means and means for electric power propulsion including an electric circuit, of a mechanism comprising a first means connected to be responsive to the operation of said braking means, and a second means in said electric circuit and responsive to the operation of the first means to initially break the said circuit and to then subsequently restore the said circuit by a continued operation in the actuating direction prior to the complete release of said braking means.

3. In combination with a vehicle having braking means and means for electric power propulsion including an electric circuit, of a mechanism comprising a first means connected to be responsive to the operation of said braking means, and a second means in said electric circuit and responsive to the operation of the first means to initially break the said circuit and to then subsequently restore the said circuit at a predetermined point in the operation of said first said means prior to the complete range of operation.

4. In combination with a vehicle having braking means and means for electric power propulsion including an electric circuit, of a mechanism comprising a means responsive to the operation of said braking means to initially break the said circuit and to then subsequently restore the said circuit when the braking means arrives at full gripping position.

5. In combination with a vehicle having braking means, and means for electric power propulsion including an electric circuit, an interrupter in said electric circuit including a pair of contacts and an electric conductor for bridging said contacts, means responsive to the operation of said braking means for moving said conductor out of circuit conducting relation when said means are operating in one direction, and restoring conducting relation after being moved in said direction a certain predetermined amount.

6. In combination with a vehicle having braking means, and means for electric power propulsion including an electric circuit, an interrupter in said electric circuit including a pair of contacts and an electric conductor for bridging said contacts, means responsive to the operation of said braking means for moving said conductor out of circuit conducting relation when said means are operating in one direction, and restoring conducting relation after being moved in said direction a certain predetermined amount, the last said means when moving in the other direction having no effect on said conductor.

7. In combination with a vehicle having braking means and means for electric power propulsion including an electric circuit, an interrupter in said electric circuit comprising a pair of contacts, an electric conductor for bridging said contacts, a pawl operable in one direction for moving said conductor, and an abutment for engaging the pawl in a movement of the abutment in one direction with relation to the pawl and to then release the pawl after a predetermined movement in said direction, and means responsive to the operation of the braking means for operating said abutment.

8. In combination with a vehicle having braking means, and means for electric power propulsion including an electric circuit, an interrupter in said electric circuit comprising a pair of contacts, an electric conductor for bridging said contacts, a pawl operable in one direction for moving said conductor, an abutment engaging the pawl in a movement of the abutment in one direction with relation to the pawl and to then release the pawl after a predetermined movement in said direction, said pawl then returning to starting position and being ineffective by movement of the abutment in the opposite direction for operating said conductor, and means responsive to the operation of the braking means for operating said abutment.

9. In combination with a vehicle having braking means, and means for electric power propulsion including an electric circuit, an interrupter in said electric circuit comprising a pair of contacts, an electric conductor for bridging said contacts, a lever for pivotally mounting said conductor, a pawl carried by said lever, an abutment engaging the pawl in a movement of the abutment in one direction with relation to the pawl and to then release the pawl after a predetermined movement in said direction, said pawl then returning to starting position and being ineffective by movement of the abutment in the opposite direction for operating said conductor, and means responsive to the operation of the braking means for operating said abutment.

10. In combination with a vehicle having braking means, and means for electric power propulsion including an electric circuit, an interrupter in said electric circuit comprising a pair of contacts, an electric conductor for bridging said contacts, a lever for pivotally mounting said conductor, a pawl carried by said lever, a rod movable in a straight line and notched to provide an abutment to engage said pawl in a movement of the abutment in one direction with relation to the pawl and to then release the pawl after a predetermined movement in said direction, said pawl then returning to starting position and being ineffective by movement of the abutment in the opposite direction for operating said conductor, and means responsive to the operation of the braking means for operating said abutment.

BENJAMIN B. FOLLETT.